(12) United States Patent
Choi et al.

(10) Patent No.: US 12,087,946 B2
(45) Date of Patent: Sep. 10, 2024

(54) POSITIVE ELECTRODE ACTIVE MATERIAL AND LITHIUM SECONDARY BATTERY COMPRISING THE SAME

(71) Applicant: ECOPRO BM CO., LTD., Cheongju-si (KR)

(72) Inventors: Gwang Seok Choi, Cheongju-si (KR); Moon Ho Choi, Cheongju-si (KR); Jun Won Suh, Cheongju-si (KR); Jin Kyeong Yun, Cheongju-si (KR); Jung Han Lee, Cheongju-si (KR); Seung Woo Choi, Cheongju-si (KR); Joong Ho Bae, Cheongju-si (KR); Du Yeol Kim, Cheongju-si (KR)

(73) Assignee: ECOPRO BM CO., LTD., Cheongju-si (KR)

( * ) Notice: Subject to any disclaimer, the term of this patent is extended or adjusted under 35 U.S.C. 154(b) by 139 days.

(21) Appl. No.: 17/382,667

(22) Filed: Jul. 22, 2021

(65) Prior Publication Data

US 2022/0131143 A1 Apr. 28, 2022

(30) Foreign Application Priority Data

Oct. 27, 2020 (KR) .................. 10-2020-0140017

(51) Int. Cl.
*H01M 4/525* (2010.01)
*H01M 4/505* (2010.01)
*H01M 10/0525* (2010.01)
*H01M 4/02* (2006.01)

(52) U.S. Cl.
CPC .......... *H01M 4/525* (2013.01); *H01M 4/505* (2013.01); *H01M 10/0525* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 2010/0316910 A1* | 12/2010 | Kajiyama | .............. C01G 51/50 |
| | | | 429/223 |
| 2016/0049648 A1 | 2/2016 | Noh et al. | |
| 2016/0359165 A1* | 12/2016 | Kim | ...................... H01M 4/582 |
| 2018/0040890 A1 | 2/2018 | Choi et al. | |
| 2019/0148725 A1* | 5/2019 | Choi | ..................... H01M 4/525 |
| | | | 429/220 |
| 2020/0161650 A1* | 5/2020 | Park | ...................... H01M 4/525 |

FOREIGN PATENT DOCUMENTS

| | | |
|---|---|---|
| EP | 2 698 351 A1 | 2/2014 |
| EP | 3 613 707 A2 | 2/2020 |
| JP | 2004-335278 A | 11/2004 |
| JP | 2012-230898 A | 11/2012 |

(Continued)

*Primary Examiner* — Carlos Barcena
(74) *Attorney, Agent, or Firm* — Studebaker & Brackett PC (57) ABSTRACT

The present invention relates to a positive electrode active material which makes it possible to improve the electrochemical properties and stability of a positive electrode active material including a lithium composite oxide by adjusting the direction of a concentration gradient of a metal element of the lithium composite oxide, and a lithium secondary battery using a positive electrode including the positive electrode active material.

13 Claims, 4 Drawing Sheets

(56) References Cited

FOREIGN PATENT DOCUMENTS

| | | | |
|---|---|---|---|
| JP | 2015-536558 | A | 12/2015 |
| JP | 2016-081626 | A | 5/2016 |
| JP | 2018-020949 | A | 2/2018 |
| JP | 2018-506140 | A | 3/2018 |
| KR | 10-2015-0076425 | A | 7/2015 |
| KR | 10-2016-0081452 | A | 7/2016 |
| KR | 10-2017-0063396 | A | 6/2017 |
| KR | 10-2018-0015046 | A | 2/2018 |
| KR | 10-2081858 | B1 | 2/2020 |
| KR | 10-2020-0099424 | A | 8/2020 |

* cited by examiner

POSITIVE ELECTRODE ACTIVE MATERIAL AND LITHIUM SECONDARY BATTERY COMPRISING THE SAME

CROSS-REFERENCE TO RELATED APPLICATION

This application claims priority to and the benefit of Korean Patent Application No. 10-2020-0140017, filed on Oct. 27, 2020, the disclosure of which is incorporated herein by reference in its entirety.

BACKGROUND

1. Field of the Invention

The present invention relates to a positive electrode active material which includes a lithium composite oxide and makes it possible to improve electrochemical properties and stability by adjusting a direction of the concentration gradient of a metal element of the lithium composite oxide, and a lithium secondary battery using a positive electrode including the positive electrode active material.

2. Discussion of Related Art

Batteries store electrical power by using materials facilitating an electrochemical reaction at a positive electrode and a negative electrode. As a representative example of such batteries, there is a lithium secondary battery storing electrical energy due to a difference in chemical potential when lithium ions are intercalated/deintercalated into/from a positive electrode and a negative electrode.

The lithium secondary battery uses materials enabling reversible intercalation/deintercalation of lithium ions as positive electrode and negative electrode active materials, and is produced by charging an organic electrolyte solution or a polymer electrolyte solution between the positive electrode and the negative electrode.

A lithium composite oxide is used as a positive electrode active material of the lithium secondary battery, and composite oxides such as $LiCoO_2$, $LiMn_2O_4$, $LiNiO_2$, $LiMnO_2$, etc. are being studied.

Among the positive electrode active materials, $LiCoO_2$ is most widely used due to excellent lifetime characteristics and charge/discharge efficiency, but it is expensive because of the limited resource of cobalt, which is used as a raw material, and thus has a disadvantage of limited price competitiveness.

Lithium manganese oxides such as $LiMnO_2$ and $LiMn_2O_4$ have advantages of excellent thermal safety and low costs, but also have problems of small capacity and poor high-temperature characteristics. In addition, while a $LiNiO_2$-based positive electrode active material exhibits a battery characteristic such as a high discharge capacity, due to cation mixing between Li and a transition metal, it is difficult to synthesize the $LiNiO_2$-based positive electrode active material, thereby causing a big problem in rate characteristics.

In addition, depending on the intensification of such cation mixing, a large amount of Li by-products is generated, and since most of the Li by-products consist of compounds of LiOH and $Li_2CO_3$, they become a cause of gelation in preparation of a positive electrode paste and gas generation according to charge/discharge progression after the preparation of an electrode. Residual $Li_2CO_3$ increases the swelling phenomenon of a cell and thus reduces cycles and also leads to the swelling of a battery.

To compensate for these shortcomings, the demand for a high-Ni positive electrode active material containing 50% or more of a nickel (Ni) content as a positive electrode active material for a secondary battery has begun to increase. While such a high-Ni positive electrode active material has high capacity, due to the increased nickel content in the positive electrode active material, structural instability caused by Li/Ni cation mixing occurs. Because of the structural instability of a positive electrode active material, a lithium secondary battery may dramatically deteriorate not only at high temperature but also at room temperature.

Therefore, to compensate for the problems of such a high-Ni positive electrode active material, the development of a positive electrode active material is needed.

SUMMARY OF THE INVENTION

In the lithium secondary battery market, the growth of lithium secondary batteries for electric vehicles plays a leading role, and the demand for positive electrode materials used in lithium secondary batteries is also constantly changing.

For example, conventionally, in terms of securing safety, lithium secondary batteries using LFP have been mainly used. However, recently, the use of a nickel-based lithium composite oxide, which has a larger energy capacity per weight than LFP, is expanding.

In line with the above trend of the positive electrode active materials, the present invention is directed to providing a high-Ni lithium composite oxide for realizing high capacity of a cell for automobiles or a positive electrode active material including the lithium composite oxide.

In addition, the present invention is also directed to providing a positive electrode including the positive electrode active material defined herein.

Moreover, the present invention is also directed to providing a lithium secondary battery using the positive electrode defined herein.

One aspect of the present invention provides a positive electrode active material, which includes a lithium composite oxide enabling lithium intercalation/deintercalation, and at least one metal element of the lithium composite oxide exhibits a concentration gradient which simultaneously has a first concentration gradient section having a (+) slope and a second concentration gradient section having a (−) slope from an outermost surface of the lithium composite oxide toward the center thereof.

Here, from the outermost surface of the lithium composite oxide, the first concentration gradient section and the second concentration gradient section may be continuously present. In addition, there is the first concentration gradient section from the outermost surface of the lithium composite oxide to a predetermined depth, and the second concentration gradient section may be located at an inner side of the first concentration gradient section.

The positive electrode active material according to the present invention may exhibit a concentration gradient in which, in the first concentration gradient section, a nickel concentration of the lithium composite oxide is decreased, and a concentration of at least one selected from cobalt, manganese and aluminum is increased from the surface toward the center of the lithium composite oxide, and in the second concentration gradient section, a nickel concentration of the lithium composite oxide is increased, and a concentration of at least one selected from cobalt, manganese and aluminum is decreased from the surface toward the center of the lithium composite oxide.

The lithium composite oxide may be represented by Formula 1 below:

$$Li_wNi_{1-(x+y+z)}Co_xM1_yM2_zO_{2+\delta}$$

(Wherein,

M1 is at least one selected from Mn or Al,

M2 is at least one selected from P, Sr, Ba, B, Ti, Zr, Mn, Al, W, Ce, Hf, Ta, F, Mg, Cr, V, Fe, Zn, Si, Y, Ga, Sn, Mo, Ge, Nd, Gd and Cu, M1 and M2 are different elements, $0.5 \leq w \leq 1.5$, $0 \leq x \leq 0.50$, $0 \leq y \leq 0.20$, $0 \leq z \leq 0.20$, and $0 \leq \delta \leq 0.02$.)

In addition, another aspect of the present invention provides a positive electrode including the positive electrode active material defined herein.

Moreover, still another aspect of the present invention provides a lithium secondary battery using the positive electrode defined herein.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, a positive electrode active material according to the present invention, and a lithium secondary battery which uses a positive electrode including the positive electrode active material will be described in further detail.

Positive Electrode Active Material

According to one aspect of the present invention, a positive electrode active material including a lithium composite oxide enabling lithium intercalation/deintercalation is provided. The lithium composite oxide may include a primary particle having a layered crystal structure and a secondary particle formed by aggregating the primary particles.

Here, the primary particle refers to one grain or crystallite, and the secondary particle refers to an aggregate formed by aggregating a plurality of primary particles. There may be voids and/or a grain boundary between the primary particles constituting the secondary particle.

For example, the primary particle may be spaced apart from a neighboring primary particle in the secondary particle, thereby forming an inner void. In addition, the primary particle may not form a grain boundary by being in contact with a neighboring primary particle, but may be in contact with an inner void, thereby forming a surface present inside the secondary particle.

Meanwhile, a surface of the primary particle exposed to the outside air, present on the outermost surface of the secondary particle, forms the surface of the secondary particle.

Here, as the average particle diameter of the primary particle may be 0.1 to 5 μm, preferably, 0.1 to 3 μm, the optical densities of the positive electrodes formed using positive electrode active materials according to various embodiments of the present invention may be realized. In addition, the average particle diameter of the secondary particle may vary according to the number of aggregated primary particles, but may be 3 to 20 μm.

In the lithium composite oxide included in positive electrode active materials according to various embodiments of the present invention, at least one metal element of the lithium composite oxide may exhibit a concentration gradient simultaneously having a first concentration gradient section having a (+) slope and a second concentration gradient section having a (−) slope from an outermost surface toward the center of the lithium composite oxide.

Here, in terms of a concentration gradient generated by at least one metal element of the lithium composite oxide, the (+) slope and the (−) slope may be deduced from a graph of the change in concentrations of the metal elements measured from the outermost surface toward the center of the lithium composite oxide, for example, through EDX analysis of the cross-section of the lithium composite oxide. In addition, the ordinal number(s) used to designate the concentration gradient section(s) having (+) and/or (−) slope(s) is/are only used to distinguish the concentration gradient having a (+) slope from the concentration gradient having a (−) slope.

Through the EDX analysis of the cross-section of the lithium composite oxide, it is possible to predict an entire concentration gradient for the lithium composite oxide in the form of a bulk, not a cross-section, from the change in concentrations or concentration gradients of the metal elements measured from the outermost surface toward the center of the lithium composite oxide.

The "having a concentration gradient having a (+) slope from the outermost surface toward the center of the lithium composite oxide" means an increase in concentration of at least one metal element of the lithium composite oxide from the outermost surface toward the center of the lithium composite oxide. On the other hand, the "having a concentration gradient having a (−) slope from the outermost surface to the center of the lithium composite oxide" means a decrease in concentration of at least one metal element of the lithium composite oxide from the outermost surface toward the center of the lithium composite oxide.

In addition, it is sufficient for the "having a concentration gradient having a (+) slope from the outermost surface toward the center of the lithium composite oxide" to have a (+) slope for the concentration value of a specific metal element between the starting point and the end point of the concentration gradient section having a (+) slope, and the change in slope according to the subtle difference in concentration values of a specific metal element in a partial section between the starting point and the end point of the concentration gradient section having a (+) slope is not considered. Here, the subtle difference between concentration values may mean that, in some sections within the concentration gradient section having a (+) slope, there is no concentration value less than the concentration value of a metal element at the starting point of the concentration gradient having a (+) slope or more than the concentration value of a metal element at the end point thereof.

Likewise, it might be understood that it is sufficient for the having a concentration gradient having a (−) slope from the outermost surface toward the center of the lithium composite oxide to have a (−) slope for the concentration value of a specific metal element between the starting point and the end point of the concentration gradient section having a (−) slope. Therefore, the change in slope according to the subtle difference in concentration value of a specific metal element in a partial section between the starting point and the end point of the concentration gradient section having a (−) slope is not considered, indicating that there is no concentration value more than the concentration value having a metal element at the starting point of the concentration gradient section having a (−) slope or less than the concentration value of a metal element at the end point thereof in a partial section in the concentration gradient section having a (−) slope.

For example, the having a concentration gradient having a (+) slope from the outermost surface toward the center of the lithium composite oxide may mean that the slope for the concentration value of a specific metal element between the starting point and the end point of the concentration gradient section having a (+) slope is (+), and the absolute value of the difference in the concentration value of a specific metal element between the starting point and the end point of the concentration gradient having a (+) slope is more than 5.0 mol %.

In addition, the having a concentration gradient having a (−) slope from the outermost surface toward the center of the lithium composite oxide may mean that the slope for the concentration value of a specific metal element between the starting point and the end point of the concentration gradient section having a (−) slope is (−), and the absolute value of the difference in the concentration value of a specific metal element between the starting point and the end point of the concentration gradient having a (−) slope is more than 5.0 mol %.

In one embodiment, a concentration gradient in the lithium composite oxide may be exhibited from the outermost surface of the lithium composite oxide. More specifically, the first concentration gradient section and the second concentration gradient section may be continuously present from the outermost surface of the lithium composite oxide.

That is, the lithium composite oxide according to the present invention may have a concentration gradient in which the concentration of at least one metal element of the lithium composite oxide is increased or decreased from the outermost surface of the lithium composite oxide, and therefore, the electrochemical properties and stability of the lithium composite oxide may be improved. In addition, as a concentration gradient in which the concentration of at least one metal element of the lithium composite oxide from the outermost surface of the lithium composite oxide is increased or decreased is exhibited, the specific surface area of the lithium composite oxide may be reduced, and thus the surface side reactions of the lithium composite oxide may be reduced.

In addition, according to the present invention, when the average particle diameter (D50) of the lithium composite oxide (secondary particle) is indicated as d, the first concentration gradient section and the second concentration gradient section are preferably present in a depth range of 0.05d to 0.33d from the outermost surface of the lithium composite oxide.

In addition, the first concentration gradient section and the second concentration gradient section may be present within a depth of 1 μm, preferably, 0.75 μm, and more preferably 0.50 μm from the outermost surface of the lithium composite oxide. When the first concentration gradient section and the second concentration gradient section are present to a depth exceeding 1 μm from the outermost surface of the lithium composite oxide, there is a risk of causing instability of the crystal structure in the surface part of the lithium composite oxide.

Here, although the first concentration gradient section and the second concentration gradient section are present to a depth of 0.33d from the outermost surface of the lithium composite oxide, the depth at which the second concentration gradient section is present is preferably within 1 μm from the outermost surface of the lithium composite oxide.

In this case, from the end point (inside the second concentration gradient section) of the second concentration gradient section relatively adjacent to the center of the lithium composite oxide, there may be a concentration maintenance section in which the concentration of at least one metal element of the lithium composite oxide is maintained from the surface toward the center of the lithium composite oxide.

Here, the concentration maintenance section may mean a section in which the absolute value of the rate of change in the concentration of at least one metal element is 5.0 mol %, preferably 3.0 mol %, and more preferably 2.0 mol % or less.

Accordingly, the lithium composite oxide has the first concentration gradient section and the second concentration gradient section sequentially within a predetermined depth from the outermost surface of the lithium composite oxide, and has a concentration maintenance section at an inner side of the second concentration gradient section, thereby stabilizing the crystal structure of the lithium composite oxide.

As described above, from the outermost surface of the lithium composite oxide to the predetermined depth, there is the first concentration gradient section, and the second concentration gradient section is present at an inner side of the first concentration gradient section.

Here, a nickel concentration of the lithium composite oxide in the first concentration gradient section may be decreased, and a concentration of at least one selected from cobalt, manganese and aluminum may be increased from the surface to the center of the lithium composite oxide, and a nickel concentration of the lithium composite oxide in the second concentration gradient section may be increased, and a concentration of at least one selected from cobalt, manganese and aluminum may be decreased from the surface to the center of the lithium composite oxide.

Likewise, due to the presence of a concentration gradient in which a nickel concentration of the lithium composite oxide in a region adjacent to the outermost surface of the lithium composite oxide is increased or decreased, and more specifically, a nickel concentration of the lithium composite oxide is decreased by a certain amount and then increased from the outermost surface of the lithium composite oxide, cation mixing between a Li ion and an Ni ion may be reduced on the surface of the lithium composite oxide.

In the case of a high-Ni (Ni≥80 mol %) lithium composite oxide having a high nickel content in the average composition of the lithium composite oxide, as Li/Ni cation mixing occurs on the surface, electrochemical properties deteriorate, and as a nickel content of the lithium composite oxide is excessively increased, there is a problem of an instable crystal structure.

However, like the lithium composite oxide described herein, when there is a concentration gradient (in this case, at least one selected from cobalt, manganese and aluminum has a concentration gradient opposite to that of nickel) in which a nickel concentration of the lithium composite oxide is reduced by a certain amount and then increased from the outermost surface of the lithium composite, it is possible to reduce Li/Ni cation mixing on the surface of the lithium composite oxide, and further stabilize the overall crystal structure of the lithium composite oxide.

In addition, in one embodiment, the nickel concentration of the lithium composite oxide in the concentration maintenance section may be higher than those in the first concentration gradient section and the second concentration gradient section. Therefore, as described above, although the nickel content in the average composition of the lithium composite oxide is high (Ni≥80 mol %), nickel contents in the first concentration gradient section and the second concentration gradient section relatively adjacent to the surface of the lithium composite oxide are adjusted, thereby reducing the possibility of Li/Ni cation mixing occurring on the surface thereof.

In this case, as the concentrations of at least one selected from cobalt, manganese and aluminum of the lithium composite oxide in the first concentration gradient section and the second concentration gradient section are adjusted to be higher than that in the concentration maintenance section, it is possible to stabilize the overall crystal structure of the lithium composite oxide.

Meanwhile, the lithium composite oxide defined herein may be an oxide having a core-shell structure. In this case, the first concentration gradient section, the second concentration gradient section and the concentration maintenance section are present in the core, and there may be a coating layer to be described later as a shell on at least a part of the core surface. Here, the first concentration gradient section, the second concentration gradient section and the concentration maintenance section are sequentially present from the outermost surface of the core.

In addition, in another embodiment, the first concentration gradient section may be present in the shell of the core-shell structure, and the second concentration gradient section and the concentration maintenance section may be present in the core thereof. In still another embodiment, the first concentration gradient section and the second concentration gradient section may be present in the shell of the core-shell structure, and the concentration maintenance section may be present in the core. If the first concentration gradient section or the first concentration gradient section and the second concentration gradient section are present in the shell, a coating layer to be described below may be optionally present on at least a part of the surface of the shell.

In still another embodiment, the lithium composite oxide is an oxide having a core-shell structure, and the first concentration gradient section and the second concentration gradient section may be present to cover the surface of the shell.

In the above-described lithium composite oxide having various core-shell structures, the core and the shell may be present as separate layers distinct from each other, or as a layer in which the core and the shell are not substantially distinguished (e.g., mixed as a solid solution).

In addition, the lithium composite oxide defined herein may have a single bulk structure, other than a core-shell structure, and the first concentration gradient section, the second concentration gradient section and the concentration maintenance section may be present in the single bulk structure.

The lithium composite oxide defined herein may be represented by Formula 1 below.

$$Li_wNi_{1-(x+y+z)}Co_xM1_yM2_zO_{2+\delta}$$

Here,

M1 is at least one selected from Mn or Al,

M2 is at least one selected from the group consisting of P, Sr, Ba, B, Ti, Zr, Mn, Al, W, Ce, Hf, Ta, F, Mg, Cr, V, Fe, Zn, Si, Y, Ga, Sn, Mo, Ge, Nd, Gd and Cu, M1 and M2 are different elements, $0.5 \leq w \leq 1.5$, $0 \leq x \leq 0.50$, $0 \leq y \leq 0.20$, $0 \leq z \leq 0.20$, and $0 \leq \delta \leq 0.02$.

Here, the lithium composite oxide may be a high-Ni lithium composite oxide in which the concentrations (mol %) of Ni, Co, M1 and M2 of the lithium composite oxide satisfy the following Equation 1.

$$Ni/(Ni + Co + M1 + M2) \geq 80.0 \qquad \text{[Equation 1]}$$

In addition, positive electrode active materials according to some embodiments of the present invention may include a coating layer which covers at least a part of the primary particle (e.g., the interface between the primary particles) and/or the surface of the secondary particle formed by aggregating the primary particles.

For example, the coating layer may be present to cover at least a part of an exposed surface of the primary particle. Particularly, the coating layer may be present to cover at least a part of the exposed surface of the primary particle present on the outermost surface of the secondary particle.

Accordingly, the coating layer may be present as a layer that continuously or discontinuously coats a surface(s) of the primary particle and/or the secondary particle formed by aggregating the primary particles. When the coating layer is present discontinuously, it may be present in an island shape.

The coating layer present as described above may contribute to improvement of physical and electrochemical properties of the positive electrode active material.

In addition, the coating layer may be present in the form of a solid solution in which there is no interface between the primary particle and/or the secondary particle formed by aggregating the primary particles.

The coating layer may include at least one oxide represented by Formula 2 below. That is, the coating layer may be defined as a region in which an oxide represented by Formula 2 below is present.

$$Li_aM3_bO_c \qquad \text{[Formula 2]}$$

Here,

M3 is at least one selected from the group consisting of Ni, Mn, Co, Fe, Cu, Nb, Mo, Ti, Al, Cr, Zr, Zn, Na, K, Ca, Mg, Pt, Au, B, P, Eu, Sm, W, V, Ba, Ta, Sn, Hf, Ce, Gd and Nd, 0≤a≤10, 0≤b≤8, and 2≤c≤13.

In addition, the coating layer may include different types of oxides in one layer, or the different types of oxides represented by Formula 2 may be present in separate layers.

The oxide represented by Formula 2 may be physically and/or chemically bonded with the primary particle represented by Formula 1. In addition, the oxide may form a solid solution with the primary particle represented by Formula 1.

The positive electrode active material according to the embodiment may include a coating layer that covers at least a part of the primary particle (e.g., the interface between the primary particles) and/or the surface of a secondary particle formed by aggregating the primary particles, thereby increasing structural stability.

In addition, when the positive electrode active material is used in a lithium secondary battery, the high temperature storage stability and lifespan characteristics of the positive electrode active material may be improved. In addition, as the oxide may reduce residual lithium in the positive electrode active material and serve as a migration pathway of lithium ions, there may be an effect of improving the efficiency characteristics of the lithium secondary battery.

In addition, in some cases, the oxide may not only be present on at least a part of the interface between the primary particles and the surface of the secondary particle, but also present in internal voids formed in the secondary particle.

The oxide is an oxide in which lithium and an element represented by A are combined or an oxide of A, and may be, for example, $Li_aW_bO_c$, $Li_aZr_bO_c$, $Li_aTi_bO_c$, $Li_aNi_bO_c$, $Li_aB_bO_c$, $W_bO_c$, $Zr_bO_c$, $Ti_bO_c$ or $B_bO_c$, but the above examples are merely described for convenience of understanding, and the oxide defined in the present invention is not limited to the above-described examples.

In another embodiment, the oxide may be or may further include an oxide in which lithium and at least two types of elements represented by A are combined. The oxide in which lithium and at least two types of elements represented by A are combined may be, for example, $Li_a(W/Ti)_bO_c$, $Li_a(W/Zr)_bO_c$, $Li_a(W/Ti/Zr)_bO_c$, or $Li_a(W/Ti/B)_bO_c$, but the present invention is not necessarily limited thereto.

Here, the oxide may have a concentration gradient decreasing from the surface toward the center of the secondary particle. Accordingly, the concentration of the oxide may decrease from the outermost surface of the secondary particle toward the center of the secondary particle.

As described above, as the oxide has a concentration gradient decreasing from the surface toward the center of the secondary particle, residual lithium present on the surface of the positive electrode active material may be effectively reduced, thereby preventing side reactions caused by unreacted residual lithium in advance. In addition, a decrease in crystallinity in the inner surface region of the positive electrode active material caused by the oxide may be prevented. In addition, the breakdown of the entire structure of the positive electrode active material due to the oxide in an electrochemical reaction may be prevented.

In addition, the coating layer may include a first oxide layer including at least one oxide represented by Formula 2, and a second oxide layer which includes at least one oxide represented by Formula 2, which is a different oxide from the oxide included in the first oxide layer.

For example, the first oxide layer may be present while covering at least a part of the exposed surface of the primary particle present on the outermost surface of the secondary particle, and the second oxide layer may be present while covering at least a part of the exposed surface of the primary particle not covered by the first oxide layer and the surface of the first oxide layer.

Lithium Secondary Battery

Another aspect of the present invention may provide a positive electrode including a positive electrode current collector and a positive electrode active material layer formed on the positive electrode current collector. Here, the positive electrode active material layer may include positive electrode active materials according to various embodiments of the present invention. Therefore, since the positive electrode active material is the same as described above, detailed description thereof will be omitted for convenience, and hereinafter, other components that have not been described will be described.

The positive electrode current collector is not particularly limited as long as it does not cause a chemical change in a battery and has conductivity, and for example, stainless steel, aluminum, nickel, titanium, calcined carbon, or aluminum or stainless steel whose surface is treated with carbon, nickel, titanium or silver may be used. In addition, the positive electrode current collector may conventionally have a thickness of 3 to 500 µm, and fine irregularities may be formed on the surface of the current collector, thereby increasing the adhesive strength of a positive electrode active material. For example, the positive electrode current collector may be used in various forms such as a film, a sheet, a foil, a net, a porous body, foam, a non-woven fabric, etc.

The positive electrode active material layer may be prepared by coating the positive electrode current collector with a positive electrode slurry composition including the positive electrode active material, a conductive material, and a binder included optionally as needed.

Here, the positive electrode active material is included at 80 to 99 wt %, and specifically, 85 to 98.5 wt % with respect to the total weight of the positive electrode active material layer. When the positive electrode active material is included in the above content range, excellent capacity characteristics may be exhibited, but the present invention is not limited thereto.

The conductive material is used to impart conductivity to an electrode, and is not particularly limited as long as it has electron conductivity without causing a chemical change in a battery. A specific example of the conductive material may be graphite such as natural graphite or artificial graphite; a carbon-based material such as carbon black, acetylene black, Ketjen black, channel black, furnace black, lamp black, thermal black or a carbon fiber; a metal powder or metal fiber consisting of copper, nickel, aluminum, or silver; a conductive whisker consisting of zinc oxide or potassium titanate; a conductive metal oxide such as titanium oxide; or a conductive polymer such as a polyphenylene derivative, and one or a mixture of two or more thereof may be used.

The conductive material may be generally contained at 0.1 to 15 wt % with respect to the total weight of the positive electrode active material layer.

The binder serves to improve attachment between particles of the positive electrode active material and the adhesive strength between the positive electrode active material and a current collector. A specific example of the binder may be polyvinylidene fluoride (PVDF), a vinylidene fluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, styrene butadiene rubber (SBR), fluorine rubber, or various copolymers thereof, and one or a mixture of two or more thereof may be used. The binder may be included at 0.1 to 15 wt % with respect to the total weight of the positive electrode active material layer.

The positive electrode may be manufactured according to a conventional method of manufacturing a positive electrode, except that the above-described positive electrode active material is used. Specifically, the positive electrode may be manufactured by coating the positive electrode current collector with a positive electrode slurry composition prepared by dissolving or dispersing the positive electrode active material, and optionally, a binder and a conductive material in a solvent, and drying and rolling the resulting product.

The solvent may be a solvent generally used in the art, and may be dimethyl sulfoxide (DMSO), isopropyl alcohol, N-methylpyrrolidone (NMP), acetone or water, and one or a mixture of two or more thereof may be used. In consideration of the coating thickness and production yield of a slurry, the solvent is used at a sufficient amount for dissolving or dispersing the positive electrode active material, the conductive material and the binder and then imparting a viscosity for exhibiting excellent thickness uniformity when the slurry is applied to prepare a positive electrode.

In addition, in another exemplary embodiment, the positive electrode may be prepared by casting the positive electrode slurry composition on a separate support, and laminating a film obtained by delamination from the support on the positive electrode current collector.

Still another aspect of the present invention provides an electrochemical device including the above-described positive electrode. The electrochemical device may be, specifically, a battery, a capacitor, and more specifically, a lithium secondary battery.

The lithium secondary battery may specifically include a positive electrode, a negative electrode disposed opposite to the positive electrode, and a separator and an electrolyte, which are interposed between the positive electrode and the negative electrode. Here, since the positive electrode is the same as described above, for convenience, detailed description for the positive electrode will be omitted, and other components which have not been described below will be described in detail.

The lithium secondary battery may further include a battery case accommodating an electrode assembly of the positive electrode, the negative electrode and the separator, and optionally, a sealing member for sealing the battery case.

The negative electrode may include a negative electrode current collector and a negative electrode active material layer disposed on the negative electrode current collector.

The negative electrode current collector is not particularly limited as long as it has high conductivity without causing a chemical change in a battery, and may be, for example, copper, stainless steel, aluminum, nickel, titanium, calcined carbon, or copper or stainless steel whose surface is treated with carbon, nickel, titanium or silver, or an aluminum-cadmium alloy. In addition, the negative electrode current collector may generally have a thickness of 3 to 500 µm, and like the positive electrode current collector, fine irregularities may be formed on the current collector surface, thereby enhancing the binding strength of the negative electrode active material. For example, the negative electrode current collector may be used in various forms such as a film, a sheet, a foil, a net, a porous body, foam, a non-woven fabric, etc.

The negative electrode active material layer may be formed by coating the negative electrode current collector with a negative electrode slurry composition including the negative electrode active material, a conductive material and a binder optionally included as needed.

As the negative electrode active material, a compound enabling the reversible intercalation and deintercalation of lithium may be used. A specific example of the negative electrode active material may be a carbonaceous material such as artificial graphite, natural graphite, graphitized carbon fiber or amorphous carbon; a metallic compound capable of alloying with lithium, such as Si, Al, Sn, Pb, Zn, Bi, In, Mg, Ga, Cd, a Si alloy, a Sn alloy or an Al alloy; a metal oxide capable of doping and dedoping lithium such as $SiO_\beta$ ($0<\beta<2$), $SnO_2$, vanadium oxide, or lithium vanadium oxide; or a composite including the metallic compound and the carbonaceous material such as a Si—C composite or a Sn—C composite, and any one or a mixture of two or more thereof may be used. In addition, as the negative electrode active material, a metal lithium thin film may be used. In addition, as a carbon material, both low-crystalline carbon and high-crystalline carbon may be used. Representative examples of the low-crystalline carbon include soft carbon and hard carbon, and representative examples of the high-crystalline carbon include amorphous, sheet-type, flake-type, spherical or fiber-type natural or artificial graphite, Kish graphite, pyrolytic carbon, mesophase pitch-based carbon fiber, meso-carbon microbeads, mesophase pitches, and high-temperature calcined carbon such as petroleum or coal tar pitch derived cokes.

The negative electrode active material may be included at 80 to 99 wt % with respect to the total weight of the negative electrode active material layer.

The binder is a component aiding bonding between a conductive material, an active material and a current collector, and may be generally added at 0.1 to 10 wt % with respect to the total weight of the negative electrode active material layer. Examples of the binder may include polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene polymer (EPDM), sulfonated-EPDM, styrene butadiene rubber, nitrile-butadiene rubber, fluorine rubber, and various copolymers thereof.

The conductive material is a component for further improving conductivity of the negative electrode active material, and may be added at 10 wt % or less, and preferably, 5 wt % or less with respect to the total weight of the negative electrode active material layer. The conductive material is not particularly limited as long as it does not cause a chemical change in the battery, and has conductivity, and may be, for example, graphite such as natural graphite or artificial graphite; carbon black such as acetylene black, Ketjen black, channel black, furnace black, lamp black or thermal black; a conductive fiber such as a carbon fiber or a metal fiber; a metal powder such as fluorinated carbon, aluminum, or nickel powder; a conductive whisker such as zinc oxide or potassium titanate; a conductive metal oxide such as titanium oxide; or a conductive material such as a polyphenylene derivative.

In an exemplary embodiment, the negative electrode active material layer may be prepared by coating the negative electrode current collector with a negative electrode slurry composition prepared by dissolving or dispersing a negative electrode active material, and optionally, a binder and a conductive material in a solvent, and drying the coated composition, or may be prepared by casting the negative electrode slurry composition on a separate support and then laminating a film delaminated from the support on the negative electrode current collector.

Meanwhile, in the lithium secondary battery, a separator is not particularly limited as long as it is generally used in a lithium secondary battery to separate a negative electrode from a positive electrode and provide a diffusion path for lithium ions, and particularly, the separator has a low resistance to ion mobility of an electrolyte and an excellent electrolyte solution impregnation ability. Specifically, a porous polymer film, for example, a porous polymer film prepared of a polyolefin-based polymer such as an ethylene homopolymer, a propylene homopolymer, an ethylene/butene copolymer, an ethylene/hexene copolymer and an ethylene/methacrylate copolymer, or a stacked structure including two or more layers thereof may be used. In addition, a conventional porous non-woven fabric, for example, a non-woven fabric formed of a high melting point glass fiber or a polyethylene terephthalate fiber may be used. In addition, a coated separator including a ceramic component or a polymer material may be used to ensure thermal resistance or mechanical strength, and may be optionally used in a single- or multi-layered structure.

In addition, the electrolyte used in the present invention may be an organic liquid electrolyte, an inorganic liquid electrolyte, a solid polymer electrolyte, a gel-type polymer electrolyte, a solid inorganic electrolyte, or a molten-type inorganic electrolyte, which is able to be used in the production of a lithium secondary battery, but the present invention is not limited thereto.

Specifically, the electrolyte may include an organic solvent and a lithium salt.

The organic solvent is not particularly limited as long as it can serve as a medium enabling the transfer of ions involved in an electrochemical reaction of a battery. Specifically, the organic solvent may be an ester-based solvent such as methyl acetate, ethyl acetate, γ-butyrolactone, or ε-caprolactone; an ether-based solvent such as dibutyl ether or tetrahydrofuran; a ketone-based solvent such as cyclohexanone; an aromatic hydrocarbon-based solvent such as benzene or fluorobenzene; a carbonate-based solvent such as dimethyl carbonate (DMC), diethyl carbonate (DEC), methyl ethyl carbonate (MEC), ethyl methyl carbonate (EMC), ethylene carbonate (EC), or propylene carbonate (PC); an alcohol-based solvent such as ethyl alcohol or isopropyl alcohol; a nitrile-based solvent such as R—CN (R is a linear, branched or cyclic C2 to C20 hydrocarbon group, and may include a double bonded aromatic ring or an ether bond); an amide-based solvent such as dimethylformamide; a dioxolane-based solvent such as 1,3-dioxolane; or a sulfolane-based solvent. Among these, a carbonate-based solvent is preferably used, and a mixture of a cyclic carbonate (for example, ethylene carbonate or propylene carbonate) having high ion conductivity and high permittivity to increase the charge/discharge performance of a battery and a low-viscosity linear carbonate-based compound (for example, ethyl methyl carbonate, dimethyl carbonate or diethyl carbonate) is more preferably used. In this case, by using a mixture of a cyclic carbonate and a chain-type carbonate in a volume ratio of approximately 1:1 to 1:9, the electrolyte solution may exhibit excellent performance.

The lithium salt is not particularly limited as long as it is a compound capable of providing a lithium ion used in a lithium secondary battery. Specifically, the lithium salt may be $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2SO_4)_2$. The concentration of the lithium salt is preferably in the range of 0.1 to 2.0M. When the concentration of the lithium salt is included in the above-mentioned range, the electrolyte has suitable conductivity and viscosity and thus can exhibit excellent electrolytic performance Therefore, lithium ions can effectively migrate.

To enhance lifetime characteristics of the battery, inhibit a decrease in battery capacity, and enhance discharge capacity of the battery, the electrolyte may further include one or more types of additives, for example, a haloalkylene carbonate-based compound such as difluoroethylene carbonate, pyridine, triethylphosphite, triethanolamine, cyclic ether, ethylene diamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol or aluminum trichloride, in addition to the components of the electrolyte. Here, the additive(s) may be included at 0.1 to 5 wt % with respect to the total weight of the electrolyte.

Since the lithium secondary battery including the positive electrode active material according to the present invention stably exhibits excellent discharge capacity, excellent output characteristics and excellent lifespan characteristics, it is useful in portable devices such as a mobile phone, a notebook computer and a digital camera and an electric automobile field such as a hybrid electric vehicle (HEV).

The appearance of the lithium secondary battery according to the present invention is not particularly limited, but may be a cylindrical, prismatic, pouch or coin type using a can. In addition, the lithium secondary battery may be used in a battery cell that is not only used as a power source of a small device, but also preferably used as a unit battery for a medium-to-large battery module including a plurality of battery cells.

According to yet another exemplary embodiment of the present invention, a battery module including the lithium secondary battery as a unit cell and/or a battery pack including the same is provided.

The battery module or the battery pack may be used as a power source of any one or more medium-to-large devices including a power tool; an electric motor vehicle such as an electric vehicle (EV), a hybrid electric vehicle, and a plug-in hybrid electric vehicle (PHEV); and a power storage system.

Hereinafter, the present invention will be described in further detail with reference to examples. However, these examples are merely provided to explain the present invention, and it will not be interpreted that the scope of the present invention is limited by the examples below.

Preparation Example 1

Preparation of Positive Electrode Active Material

Example 1

20 L of distilled water and 1 kg of ammonia were put into a batch reactor (90 L batch reactor), an $N_2$ gas was provided to the reactor at a rate of 1.5 L/min, and the resulting mixture was stirred at 350 rpm while maintaining the temperature of the reactor at 45° C. As an aqueous solution for forming a core, 53 g of a 2.5M aqueous solution in which nickel sulfate, cobalt sulfate and manganese sulfate are mixed in a molar ratio of 95:3.5:1.5 was added.

The above-prepared 2.5M aqueous solution for forming a core and 28% ammonia were continuously added at 2.4 L/hr and 0.3 L/hr, respectively. In addition, a continuous reaction was carried out by adjusting the input amount of a 25% sodium hydroxide solution in order to maintain a pH at 11 to 12 in the reactor. Here, a stirring rate was controlled to 350 rpm.

As an aqueous solution for forming a shell, a 2.5M aqueous solution for forming a shell in which nickel sulfate, cobalt sulfate and manganese sulfate were mixed in a molar ratio of 54:44.5:1.5 was prepared, and put into the batch reactor (90 L batch reactor) at 2.4 L/hr, 28% ammonia was added at 0.3 L/hr, and a 25% sodium hydroxide solution was added thereto to have a pH of 11 to 12.

After the completion of the core- and shell-forming reactions, a crystallization reaction was induced by raising an internal pH of the batch reactor.

After the completion of the crystallization reaction, a spherical metal composite hydroxide precipitate was obtained from the batch reactor. The metal composite hydroxide was filtered, washed with water, and dried in a hot air dryer at 110° C. for 12 hours.

After the dried metal composite hydroxide and LiOH (Li/(Ni+Co+Mn) molar ratio=1.06) were mixed, the resulting mixture was thermally treated (first treatment) in a calcination furnace for 10 hours by raising a temperature 2° C. per minute until 690° C. while an $O_2$ atmosphere was maintained, thereby obtaining a lithium composite oxide.

Subsequently, the lithium composite oxide was mixed with $AL_2O_3$, $TiO_2$ and $ZrO_2$, and subjected to additional thermal treatment (second thermal treatment) for 10 hours by raising a temperature 2° C. per minute until 680° C. while an $O_2$ atmosphere was maintained. Here, the $Al_2O_3$ content was weighed such that the Al content became 1,600 ppm, the $TiO_2$ content was weighed such that the Ti content became 1,600 ppm, and the $ZrO_2$ content was weighed such that the Zr content became 500 ppm.

Hereinafter, distilled water was added to the lithium composite oxide and washed for 1 hour, the washed lithium composite oxide was filtered and dried, thereby obtaining a positive electrode active material. An average particle diameter (D50) of the lithium composite oxide included in the positive electrode active material was measured to be 16.5 μm.

Example 2

A positive electrode active material was prepared in the same manner as in Example 1, except that the lithium composite oxide was mixed with $H_3BO_3$ and subjected to additional thermal treatment (third thermal treatment) for 8 hours by raising a temperature 2° C. until 300° C. while maintaining an $O_2$ atmosphere. Here, the $H_3BO_3$ content was weighed such that the B content in the mixture became 400 ppm. An average particle diameter (D50) of the lithium composite oxide included in the positive electrode active material was measured to be 16.5 μm.

Example 3

A positive electrode active material was prepared in the same manner as in Example 1, except that an aqueous solution for forming a core in which nickel sulfate, cobalt sulfate and manganese sulfate were mixed in a molar ratio of 97:3:0 was used, and an aqueous solution for forming a shell in which nickel sulfate, cobalt sulfate and manganese sulfate were mixed in a molar ratio of 40:50:10 was used. An average particle diameter (D50) of the lithium composite oxide included in the positive electrode active material was measured to be 16.5 μm.

Example 4

A positive electrode active material was prepared in the same manner as in Example 1, except that an aqueous solution for forming a core in which nickel sulfate, cobalt sulfate and manganese sulfate were mixed in a molar ratio of 90:10:0 was used, an aqueous solution for forming a shell whose concentration was changed until the molar ratio of nickel sulfate, cobalt sulfate and manganese sulfate was adjusted from 65:15:20 to 40:20:40 was used, first thermal treatment was carried out for 10 hours by raising a temperature 2° C. per minute until 800° C., and second thermal treatment was carried out for 10 hours by raising a temperature 2° C. per minute until 720° C. An average particle diameter (D50) of the lithium composite oxide included in the positive electrode active material was measured to be 13.0 μm.

Example 5

20 L of distilled water and 1 kg of ammonia were added to a batch reactor (90 L batch reactor), an $N_2$ gas was provided to the reactor at a rate of 1.5 L/min, and the resulting mixture was stirred at 350 rpm while maintaining the temperature of the reactor at 45° C. 80 g of a 2.5M aqueous solution in which nickel sulfate, cobalt sulfate and manganese sulfate are mixed in a molar ratio of 95:3.5:1.5 was added.

The above-prepared 2.5M aqueous solution and 28% ammonia were continuously added at 2.4 L/hr and 0.3 L/hr, respectively. In addition, a continuous reaction was carried out by adjusting the input amount of a 25% sodium hydroxide solution in order to maintain a pH at 11 to 12 in the reactor. Here, a stirring rate was controlled to 350 rpm.

After the completion of the reaction, a spherical metal composite hydroxide precipitate was obtained by performing a crystallization reaction by raising an internal pH of the batch reactor. The metal composite hydroxide was filtered, washed with water, and dried in a hot air dryer at 110° C. for 12 hours.

After the dried metal composite hydroxide and LiOH (Li/(Ni+Co+Mn) molar ratio=1.06) were mixed, the resulting mixture was thermally treated in a calcination furnace for 10 hours by raising a temperature 2° C. per minute until 800° C. while an $O_2$ atmosphere was maintained, thereby obtaining a lithium composite oxide.

Hereinafter, distilled water was added to the lithium composite oxide and washed for 1 hour, the washed lithium composite oxide was filtered and dried, thereby obtaining a positive electrode active material. An average particle diameter (D50) of the lithium composite oxide included in the positive electrode active material was measured to be 13.0 μm.

Example 6

A positive electrode active material was prepared in the same manner as in Example 5, except that a metal composite hydroxide precursor of $Ni_{0.92}Co_{0.08}(OH)_2$ was prepared by using a precursor aqueous solution in which nickel sulfate, cobalt sulfate and manganese sulfate were mixed in a molar ratio of 92:8.0:0.0, and a lithium composite oxide was obtained by mixing the metal composite hydroxide, LiOH and 1.4 mol % $Al(OH)_3$ and thermally treating the mixture in a calcination furnace for 10 hours by raising a temperature 2° C. until 650° C. while an $O_2$ atmosphere was maintained. An average particle diameter (D50) of the lithium composite oxide included in the positive electrode active material was measured to be 14.0 μm.

Comparative Example 1

A positive electrode active material was prepared in the same manner as in Example 1, except that after core- and shell-forming reactions were completed, a crystallization reaction was not induced by raising the internal pH of the batch reactor.

Comparative Example 2

A positive electrode active material was prepared in the same manner as in Example 3, except that after core- and shell-forming reactions were completed, a crystallization reaction was not induced by raising the internal pH of the batch reactor.

Comparative Example 3

A positive electrode active material was prepared in the same manner as in Example 4, except that after core- and shell-forming reactions were completed, a crystallization reaction was not induced by raising the internal pH of the batch reactor.

Comparative Example 4

A positive electrode active material was prepared in the same manner as in Example 5, except that after core- and shell-forming reactions were completed, a crystallization reaction was not induced by raising the internal pH of the batch reactor.

Comparative Example 5

A positive electrode active material was prepared in the same manner as in Example 6, except that after core- and shell-forming reactions were completed, a crystallization reaction was not induced by raising the internal pH of the batch reactor.

Preparation Example 2

Production of Lithium Secondary Battery

A positive electrode slurry was prepared by dispersing 94 wt % of each of the positive electrode active materials prepared according to Preparation Example 1, 3 wt % of artificial graphite and 3 wt % of PVDF binder in 3.5 g of N-methyl-2-pyrrolidone (NMP). The positive electrode slurry was applied onto an aluminum (Al) thin film, which is a positive electrode current collector, having a thickness of 20 μm, dried and compressed using a roll press, thereby manufacturing a positive electrode. A loading level of the positive electrode was 7 mg/cm², and an electrode density was 3.2 g/cm³.

A coin battery was produced according to a conventionally known production process using a lithium foil as a counter electrode for the positive electrode, a porous polyethylene film (Celgard 2300, thickness: 25 μm) as a separator, and an electrolyte in which $LiPF_6$ was present at a concentration of 1.15M in a solvent in which ethylene carbonate and ethyl methyl carbonate are mixed in a volume ratio of 3:7 was used.

Experimental Example 1

Figure 1:
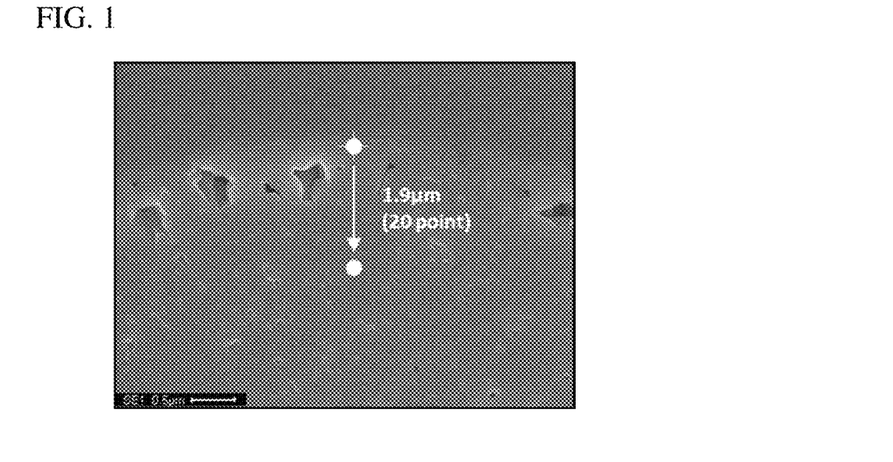
FIG. 1 is a cross-sectional SEM image obtained after cross-section treatment of a lithium composite oxide included in a positive electrode active material according to Example 2 using FIB (Ga-ion source)
Figure 2:
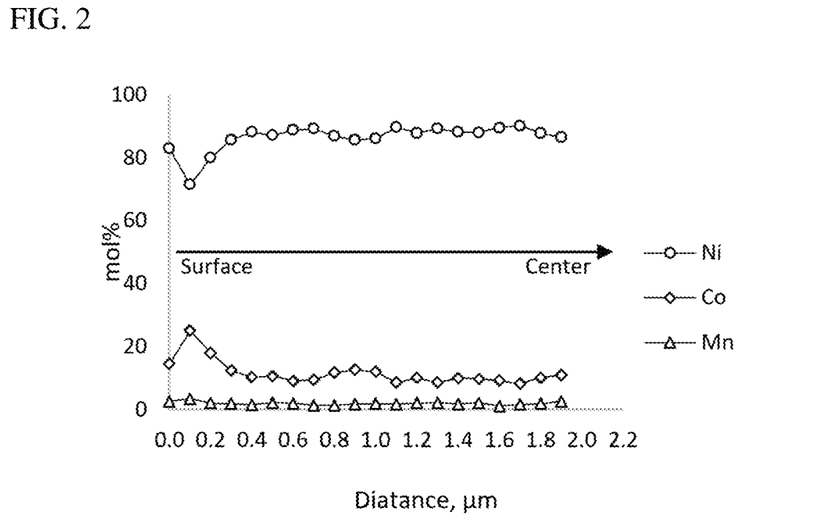
FIG. 2 is a line sum spectrum showing the contents of metal elements (Ni, Co and Mn) present along a direction from the outermost surface to the center of the lithium composite oxide confirmed through EDX analysis of the cross-sectional SEM image of FIG. 1.

SEM/EDX Analysis of Metal Composite Hydroxide and Positive Electrode Active Material FIG. 1 is a cross-sectional SEM image obtained after cross-section treatment of a lithium composite oxide included in the positive electrode active material according to Example 2 using FIB (Ga-ion source), and FIG. 2 is a line sum spectrum showing the contents of metal elements (Ni, Co and Mn) present along a direction from the outermost surface to the center of the lithium composite oxide confirmed through EDX analysis of the cross-sectional SEM image of FIG. 1.

Figure 3:
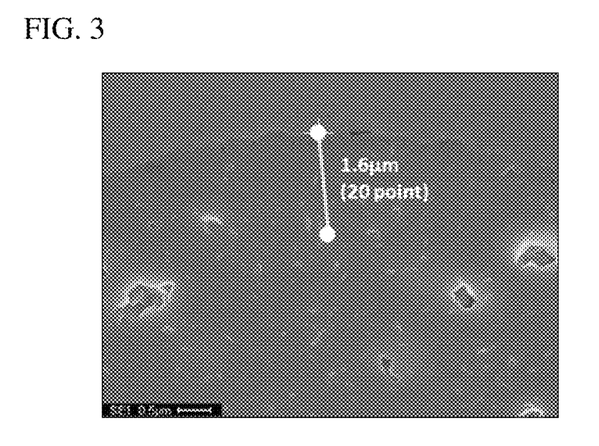
FIG. 3 is a cross-sectional SEM image obtained after cross-section treatment of a lithium composite oxide included in a positive electrode active material according to Comparative Example 1 using FIB (Ga-ion source)
Figure 4:
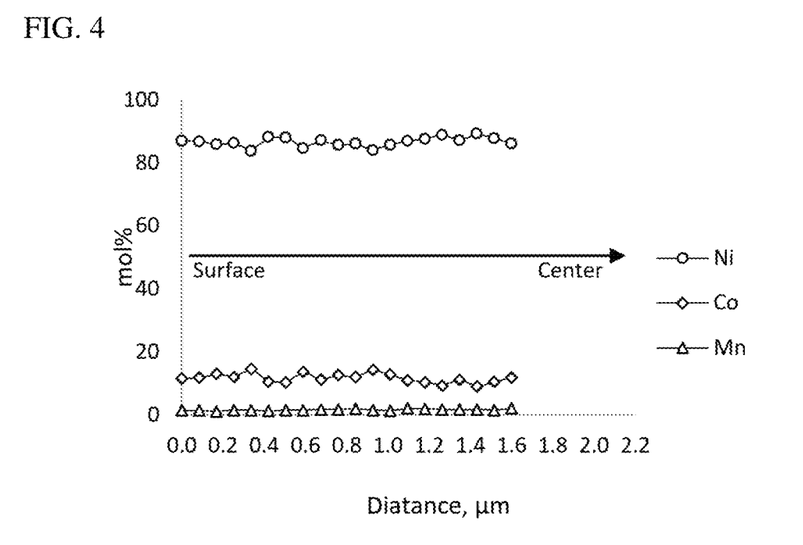
FIG. 4 is a line sum spectrum showing the contents of metal elements (Ni, Co and Mn) present along a direction from the outermost surface to the center of the lithium composite oxide confirmed through EDX analysis of the cross-sectional SEM image of FIG. 3.

FIG. 3 is a cross-sectional SEM image obtained after cross-section treatment of a lithium composite oxide included in the positive electrode active material according to Comparative Example 1 using FIB (Ga-ion source), and FIG. 4 is a line sum spectrum showing the contents of metal elements (Ni, Co and Mn) present along a direction from the outermost surface to the center of the lithium composite oxide confirmed through EDX analysis of the cross-sectional SEM image of FIG. 3.

Referring to FIG. 2, it was confirmed that at least one of metal elements of a lithium composite oxide included in the positive electrode active material exhibits a concentration gradient which includes a first concentration gradient section having a (+) slope and a second concentration gradient section having a (−) slope from the outermost surface toward the center of the lithium composite oxide.

More specifically, it was confirmed that the first concentration gradient section is present from the outermost surface of the lithium composite oxide to a predetermined depth (a depth of approximately 0.1 μm from the outermost surface), the second concentration gradient section is located at an inner side of the first concentration gradient section, and the first concentration gradient section and the second concentration gradient section are present from the outermost surface of the lithium composite oxide to a depth of 1 μm (on the basis of FIG. 2, a depth of approximately 0.5 μm).

In addition, it was confirmed that a nickel concentration of the lithium composite oxide in the first concentration gradient section decreased, and cobalt and manganese concentrations thereof increased from the surface toward the center of the lithium composite oxide, and a nickel concentration of the lithium composite oxide in the second concentration gradient section increased, and cobalt and manganese concentrations thereof decreased from the surface toward the center of the lithium composite oxide.

It was confirmed that, at the inner side of the second concentration gradient section, there is a concentration maintenance section (a depth of approximately 0.5 μm from the outermost surface of the lithium composite oxide to the center of the lithium composite oxide) in which the concentration of at least one metal element of the lithium composite oxide is maintained (that is, a location that is deeper in the center direction from the second concentration gradient section). The absolute value of the rate of change in concentrations of nickel, cobalt and/or manganese in the concentration maintenance section was 5.0 mol % or less.

Meanwhile, referring to FIG. 4 showing the line sum spectrum of the positive electrode active material according to Comparative Example 1, unlike the graph shown in FIG. 2, it was confirmed that the first concentration gradient section and the second concentration gradient section which are clearly distinguished from the outermost surface of the lithium composite oxide to a predetermined depth are not shown.

In addition, in the line sum spectra of the positive electrode active materials according to Comparative Examples 2 to 5, the concentration gradient pattern shown in FIG. 2 was not observed.

Figure 5:
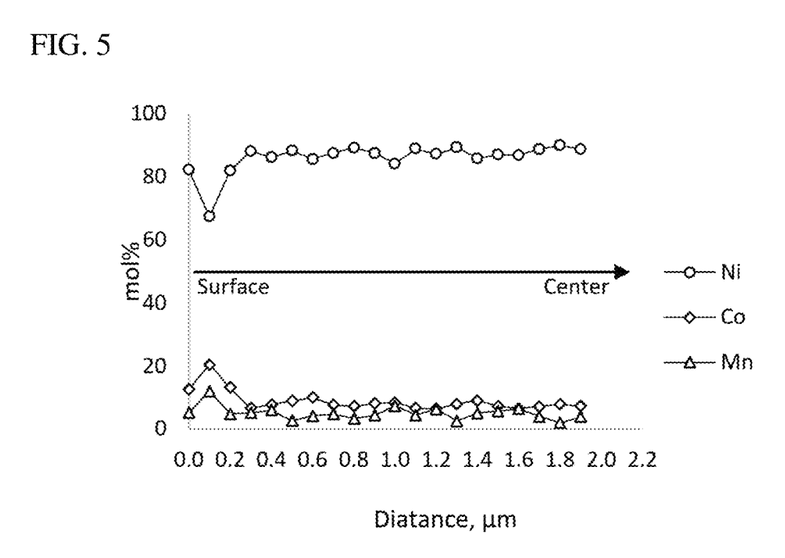
FIG. 5 is a line sum spectrum showing the contents of metal elements (Ni, Co and Mn) present along a direction from the outermost surface to the center of the lithium composite oxide confirmed through EDX analysis of the cross-sectional SEM image of Example 3.

FIG. 5 is a line sum spectrum showing the contents of metal elements (Ni, Co and Mn) present along a direction from the outermost surface to the center of the lithium composite oxide confirmed through EDX analysis on the cross-sectional SEM image of Example 3.

Figure 6:
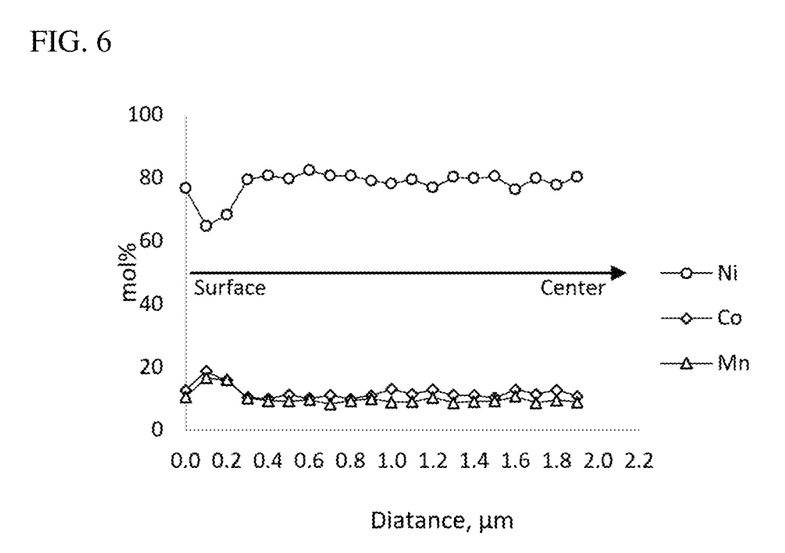
FIG. 6 is a line sum spectrum showing the contents of metal elements (Ni, Co and Mn) present along a direction from the outermost surface to the center of the lithium composite oxide confirmed through EDX analysis of the cross-sectional SEM image of Example 4.

FIG. 6 is a line sum spectrum showing the contents of metal elements (Ni, Co and Mn) present along a direction from the outermost surface to the center of the lithium composite oxide confirmed through EDX analysis of the cross-sectional SEM image of Example 4.

Figure 7:
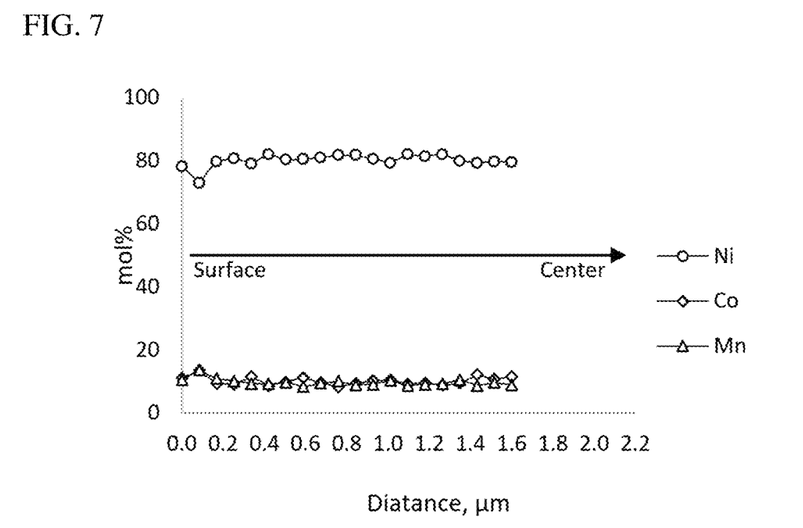
FIG. 7 is a line sum spectrum showing the contents of metal elements (Ni, Co and Mn) present along a direction from the outermost surface to the center of the lithium composite oxide confirmed through EDX analysis of the cross-sectional SEM image of Example 5.

FIG. 7 is a line sum spectrum showing the contents of metal elements (Ni, Co and Mn) present along a direction from the outermost surface to the center of the lithium composite oxide confirmed through EDX analysis of the cross-sectional SEM image of Example 5.

Figure 8:
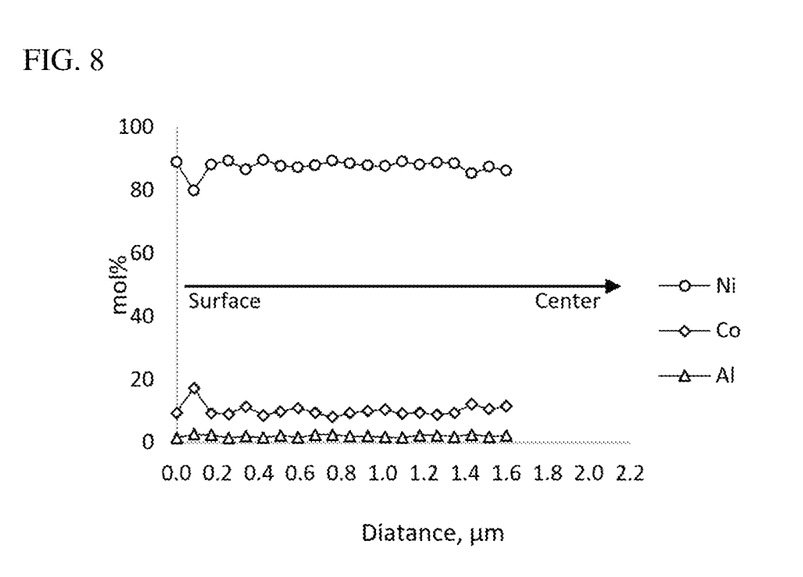
FIG. 8 is a line sum spectrum showing the contents of metal elements (Ni, Co and Mn) present along a direction from the outermost surface to the center of the lithium composite oxide confirmed through EDX analysis of the cross-sectional SEM image of Example 6.

FIG. 8 is a line sum spectrum showing the contents of metal elements (Ni, Co and Mn) present along a direction from the outermost surface to the center of the lithium composite oxide confirmed through EDX analysis of the cross-sectional SEM image of Example 6.

Referring to FIGS. 5 to 8, similar to the concentration gradient pattern shown in FIG. 2, it was confirmed that there is the first concentration gradient section from the outermost surface of the lithium composite oxide to a predetermined depth (approximately, to a depth of 0.1 μm from the outermost surface), the second concentration gradient section is located at an inner side of the first concentration gradient section, and the first concentration gradient section and the second concentration gradient section are present from the outermost surface of the lithium composite oxide to a depth of 1 μm (on the basis of FIG. 5, a depth of approximately 0.5 μm, on the basis of FIG. 6, a depth of approximately 0.4 μm, on the basis of FIG. 7, a depth of approximately 0.2 μm, and on the basis of FIG. 8, a depth of approximately 0.2 μm).

Likewise, it was confirmed that a nickel concentration of the lithium composite oxide in the first concentration gradient section decreased and cobalt and manganese concentrations increased from the surface toward the center of the lithium composite oxide, and a nickel concentration of the lithium composite oxide in the second concentration gradient section increased and cobalt and manganese concentrations decreased from the surface toward the center of the lithium composite oxide.

It was confirmed that, at an inner side of the second concentration gradient section, there is a concentration maintenance section in which the concentration of at least one metal element of the lithium composite oxide is maintained (that is, a location that is deeper in a direction from the second concentration gradient section to the center). The absolute value of the rate of change in concentrations of nickel, cobalt and/or manganese in the concentration maintenance section was 5.0 mol % or less.

Experimental Example 2

XPS Analysis of Positive Electrode Active Material

XPS analysis was performed on each of the positive electrode active materials prepared according to Preparation Example 1 to confirm whether a coating layer is present on the surface of a lithium composite oxide. The XPS analysis was performed using K-Alpha+ (ThermoFisher Scientific) (acceleration voltage: 0.5 to 2 keV, energy resolution: approximately 0.5 eV, minimum analysis area: 30 micrometers, monatomic and gas cluster ion source). The XPS analysis result is shown in Table 1 below.

TABLE 1

| Classification | Al2p | B1s | C1s | Co2p | Li1s | Mn2p | Ni2p | O1s | Ti2p | Zr3d |
| --- | --- | --- | --- | --- | --- | --- | --- | --- | --- | --- |
| Example 1 | 2.35 | 0.00 | 33.11 | 0.75 | 17.45 | 1.53 | 4.34 | 37.92 | 2.21 | 0.34 |
| Example 2 | 1.47 | 3.51 | 34.26 | 0.69 | 20.33 | 1.41 | 3.13 | 32.95 | 1.97 | 0.28 |
| Example 3 | 2.86 | 0.00 | 20.57 | 1.05 | 18.18 | 4.17 | 7.00 | 43.24 | 2.72 | 0.21 |
| Example 4 | 2.62 | 0.00 | 20.67 | 0.96 | 17.04 | 4.12 | 8.08 | 43.44 | 2.69 | 0.38 |
| Example 5 | 0.00 | 0.00 | 40.6 | 2.98 | 10.85 | 3.13 | 7.72 | 34.72 | 0.00 | 0.00 |
| Example 6 | 2.03 | 0.00 | 34.59 | 1.93 | 6.52 | 0.00 | 15.36 | 39.57 | 0.00 | 0.00 |
| Comparative Example 1 | 2.45 | 0.00 | 32.88 | 1.11 | 18.66 | 1.50 | 3.14 | 37.92 | 2.04 | 0.30 |
| Comparative Example 2 | 2.87 | 0.00 | 22.48 | 1.32 | 19.63 | 4.29 | 5.97 | 40.89 | 2.33 | 0.22 |
| Comparative Example 3 | 3.18 | 0.00 | 20.32 | 1.01 | 16.12 | 4.19 | 6.95 | 45.36 | 2.55 | 0.32 |
| Comparative Example 4 | 0.00 | 0.00 | 37.68 | 2.58 | 19.78 | 2.84 | 5.29 | 31.83 | 0.00 | 0.00 |
| Comparative Example 5 | 2.17 | 0.00 | 34.45 | 2.18 | 7.76 | 0.00 | 13.26 | 40.18 | 0.00 | 0.00 |

Referring to the result shown in Table 1, it can be confirmed that, in the cases of positive electrode active materials according to Examples 1, 3 and 4, considering that specific peaks for Al, Zr and Ti were detected, it can be confirmed that there are Al, Zr and Ti-containing coating layers on the surface of the lithium composite oxide in the positive electrode active materials according to Examples 1, 3 and 4, respectively.

In addition, in the case of the positive electrode active material according to Example 2, a peak specific for B as well as the peaks specific for Al, Zr and Ti is also detected, demonstrating that Al-, Zr- and Ti-containing coating layers and a B-containing coating layer are present on the surface of the lithium composite oxide in the positive electrode active material according to Example 2.

Experimental Example 3

Measurement of Residual Lithium and Specific Surface Area of Positive Electrode Active Material Residual lithium was measured with an amount of 0.1M HCl used until a pH reached pH 4 through pH titration. First, 5 g of a positive electrode active material was added to 100 ml of DIW, and stirred for 15 minutes, followed by filtering. Subsequently, 50 ml of the filtered solution was obtained, and then 0.1M HCl was added thereto to measure HCl consumption according to a pH change, thereby determining Q1 and Q2. Residual LiOH and $Li_2CO_3$ were calculated by the following equations.

$M1 = 23.94$ (LiOH Molecular weight)

$M2 = 73.89$ ($Li_2CO_3$ Molecular weight)

$$\text{LiOH(ppm)} = \frac{(Q1-Q2)*M1*\text{HCl}\,con.*DIW(g)}{\text{Solution(g)}*\text{powder(g)}}*10{,}000$$

$$Li_2CO_3\text{(ppm)} = \frac{2*Q2*M2/2*\text{HCl}\,con.*DIW(g)}{\text{Solution(g)}*\text{powder(g)}}*10{,}000$$

In addition, a BET specific surface area was estimated from a nitrogen gas adsorption amount at a liquid nitrogen temperature (77K) using a gas adsorption specific surface area measurement apparatus (MicrotaracBEL; BELSORP-mini II).

The result of measuring the residual lithium and BET specific surface area is shown in Table 2 below.

TABLE 2

| Classification | LiOH (ppm) | Li2CO3 (ppm) | Total (ppm) | BET ($m^2/g$) |
|---|---|---|---|---|
| Example 1 | 2,379 | 2,210 | 4,589 | 1.56 |
| Example 2 | 3,255 | 1,929 | 5,184 | 1.06 |
| Example 3 | 1,845 | 1,810 | 3,655 | 1.79 |
| Example 4 | 1,201 | 1,728 | 2,929 | 1.26 |
| Example 5 | 731 | 2,482 | 3,213 | 0.98 |
| Example 6 | 1,397 | 1,322 | 2,719 | 0.36 |
| Comparative Example 1 | 3,016 | 3,281 | 6,297 | 2.10 |
| Comparative Example 2 | 2,089 | 2,373 | 4,462 | 2.33 |
| Comparative Example 3 | 1,646 | 2,337 | 3,983 | 1.59 |
| Comparative Example 4 | 1,140 | 2,832 | 3,972 | 1.26 |
| Comparative Example 5 | 1,577 | 1,469 | 3,046 | 0.49 |

Referring to the result of Table 2, it was confirmed that, in the positive electrode active materials according to Examples 1, and 3 to 6 compared to the positive electrode active materials according to Comparative Examples 1 to 5 corresponding thereto, both of the residual lithium content and BET specific surface area are reduced.

That is, it was confirmed that residual lithium and a BET specific surface area in the final product, a positive electrode active material, may be reduced due to an additional process of inducing a crystallization reaction by increasing an internal pH of a batch reactor.

Experimental Example 4

Evaluation of Capacity and Lifespan Characteristics of Lithium Secondary Battery A charge/discharge experiment was performed on each of the lithium secondary batteries (coin cells) produced in Preparation Example 2 using an electrochemical analyzer (Toyo, Toscat-3100) by applying conditions of 25° C., a voltage range of 3.0V to 4.3V and a discharge rate of 0.1C, thereby measuring charge and discharge capacities.

In addition, 50 cycles of charging/discharging were performed on the same lithium secondary batteries at 25° C., within a driving voltage range of 3.0V to 4.4V under a 1C/1C condition, and a ratio of the discharge capacity at 50 cycles with respect to the initial capacity (cycle capacity retention) was measured.

The measurement result is shown in Table 3 below.

TABLE 3

| Classification | Charge capacity (mAh/g) | Discharge capacity (mAh/g) | Charge/ discharge efficiency (%) | Retention@50 cy (%) |
|---|---|---|---|---|
| Example 1 | 238.9 | 225.2 | 94.3 | 92.4 |
| Example 2 | 238.2 | 224.1 | 94.1 | 95.4 |
| Example 3 | 240.2 | 225.5 | 93.9 | 92.2 |
| Example 4 | 225.2 | 211.1 | 93.7 | 93.8 |
| Example 5 | 228.1 | 208.8 | 91.6 | 90.3 |
| Example 6 | 238.8 | 218.5 | 91.5 | 91.2 |
| Comparative Example 1 | 238.1 | 223.8 | 94.0 | 88.1 |
| Comparative Example 2 | 240.1 | 224.8 | 93.6 | 89.4 |
| Comparative Example 3 | 225.1 | 210.0 | 93.3 | 91.3 |
| Comparative Example 4 | 227.6 | 208.1 | 91.4 | 88.6 |
| Comparative Example 5 | 238.7 | 218.0 | 91.3 | 89.2 |

Referring to the result shown in Table 3, it was confirmed that, in the positive electrode active materials according to Examples 3 to 6, compared to the positive electrode active materials according to Comparative Examples 1 to 5 corresponding thereto, charge/discharge efficiency and cycle capacity retention are improved.

In addition, it was confirmed that, in the positive electrode active material according to Example 2 to which a B-containing coating layer was additionally introduced, compared to the positive electrode active materials according to Example 1, and Examples 3 to 6, an improved effect in terms of cycle capacity retention is exhibited.

While, generally, a high-Ni positive electrode active material for realizing the high capacity of a lithium secondary battery has a problem of low thermal stability, a positive electrode active material according to the present invention has advantages of an improvement in low thermal stability of the high-Ni positive electrode active material and an improvement in a high temperature operation characteristic by adjusting a concentration gradient direction of a metal element in a lithium composite oxide constituting the positive electrode active material.

Meanwhile, in the case of the high-Ni positive electrode active material, there is a larger amount of Li by-products such as LiOH and $Li_2CO_3$ on the surface compared to a positive electrode active material with a relatively small Ni content, and the Li by-products can become a cause of gelation in the preparation of a positive electrode paste using the positive electrode active material, or a cause of gas generation in charging/discharging and/or storage of a lithium secondary battery.

However, when a metal element in the lithium composite oxide included in the positive electrode active material according to the present invention is allowed to exhibit a concentration gradient simultaneously having a first concentration gradient section having a (+) slope and a second concentration gradient section having a (−) slope from the outermost surface toward the center of the lithium composite oxide, it is possible to reduce the contents of Li by-products on the surface of the positive electrode active material.

In addition, the surface of the positive electrode active material is a region in which side reactions with an electrolyte can occur during the charging/discharging and/or storage of a lithium secondary battery, and as the surface area of the positive electrode active material (e.g., can be represented by an indicator called a BET specific surface area) becomes larger, the possibility of side reactions can increase, leading to the phase transformation of a crystal structure in the surface of the positive electrode active material (e.g., layered structure→rock salt structure). The phase transformation of the crystal structure in the surface of the positive electrode active material is pointed out as one of the causes of reducing the lifespan characteristics of lithium secondary battery.

In the case of the positive electrode active material according to the present invention, it was confirmed that, as a metal element in the lithium composite oxide exhibits a concentration gradient simultaneously having a first concentration gradient section having a (+) slope and a second concentration gradient section having a (−) slope from the outermost surface toward the center of the lithium composite oxide, a surface area (e.g., represented by an indicator called a BET specific surface area) in which side reactions with an electrolyte can occur during the charging/discharging and/or storage of a lithium secondary battery can be reduced, thereby reducing the possibility of side reactions with an electrolyte during the charging/discharging and/or storage of a secondary battery.

As a result, the positive electrode active material according to the present invention can contribute to an improvement in electrochemical properties such as lifespan characteristics and efficiency characteristics as well as basic physical properties of the positive electrode active material by adjusting a concentration gradient direction of the metal element in the lithium composite oxide constituting the positive electrode active material.

In the above, the embodiments of the present invention have been described, but it will be understood by those of ordinary skill in the art that the present invention may be changed and modified in various ways by addition, alternation, or deletion of components without departing from the spirit of the present invention defined in the appended claims.

What is claimed is:

1. A positive electrode active material, comprising:
a lithium composite oxide enabling lithium intercalation/deintercalation,
wherein at least one metal element of the lithium composite oxide exhibits a concentration gradient including a first concentration gradient section having a (+) slope and a second concentration gradient section having a (−) slope from the outermost surface toward the center of the lithium composite oxide,
the first concentration gradient section is present from the outermost surface of the lithium composite oxide to a predetermined depth, and the second concentration gradient section is present at an inner side of the first concentration gradient section, in the first concentration gradient section, a nickel concentration of the lithium composite oxide is decreased, and a cobalt concentration of the lithium composite oxide is increased from the surface toward the center of the lithium composite oxide, and in the second concentration gradient section, a nickel concentration of the lithium composite oxide is increased, and a cobalt concentration of the lithium composite oxide is decreased from the surface toward the center of the lithium composite oxide, wherein:
in the first concentration gradient section, a concentration of at least one selected from manganese and aluminum thereof is increased from the surface toward the center of the lithium composite oxide;

in the second concentration gradient section, a concentration of at least one selected from manganese and aluminum thereof is decreased from the surface toward the center of the lithium composite oxide;

there is a concentration maintenance section which is located at an inner side of the second concentration gradient section, and in which the concentration of at least one metal element of the lithium composite oxide is maintained from the surface toward the center of the lithium composite oxide; and a nickel concentration of the lithium composite oxide in the concentration maintenance section is higher than those in the first concentration gradient section and the second concentration gradient section.

2. The positive electrode active material of claim 1, wherein the first concentration gradient section and the second concentration gradient section are continuously present from the outermost surface of the lithium composite oxide.

3. The positive electrode active material of claim 2, wherein, when the average diameter of the lithium composite oxide is indicated as d, the first concentration gradient section and the second concentration gradient section are present in a depth range of 0.05d to 0.33d from the outermost surface of the lithium composite oxide.

4. The positive electrode active material of claim 3, wherein the first concentration gradient section and the second concentration gradient section are present to a depth of 1 μm from the outermost surface of the lithium composite oxide.

5. The positive electrode active material of claim 1, wherein the absolute value of the rate of change in concentration of at least one metal element in the concentration maintenance section is 5 mol % or less.

6. The positive electrode active material of claim 1, wherein the concentrations of at least one selected from cobalt, manganese and aluminum of the lithium composite oxide in the first concentration gradient section and second concentration gradient section are higher than that in the concentration maintenance section.

7. The positive electrode active material of claim 1, wherein the lithium composite oxide is represented by Formula 1 below:

(Wherein,

M1 is at least one selected from Mn or Al,

M2 is at least one selected from P, Sr, Ba, B, Ti, Zr, Mn, Al, W, Ce, Hf, Ta, F, Mg, Cr, V, Fe, Zn, Si, Y, Ga, Sn, Mo, Ge, Nd, Gd and Cu, M1 and M2 are different elements, $0.5 \leq w \leq 1.5$, $0 \leq x \leq 0.50$, $0 \leq y \leq 0.20$, $0 \leq z \leq 0.20$, and $0 \leq 8 \leq 0.02$.).

8. The positive electrode active material of claim 7, wherein the Ni, Co, M1 and M2 concentrations (mol %) of the lithium composite oxide satisfy the following Equation 1:

$$Ni/(Ni+Co+M1+M2) \geq 80.0. \quad \text{[Equation 1]}$$

9. The positive electrode active material of claim 1, wherein the lithium composite oxide comprises a primary particle having a layered crystal structure, and a secondary particle formed by aggregating primary particles.

10. The positive electrode active material of claim 9, wherein the secondary particle has an average particle diameter of 3 to 20 μm.

11. The positive electrode active material of claim 9, wherein the positive electrode active material comprises a coating layer which covers at least a part of a region selected from the interface between the primary particles and the surface of the secondary particle, and comprises at least one lithium alloy oxide represented by Formula 2 below:

$$Li_aM3_bO_c \quad \text{[Formula 2]}$$

(Wherein,

M3 is at least one selected from the group consisting of Ni, Mn, Co, Fe, Cu, Nb, Mo, Ti, Al, Cr, Zr, Zn, Na, K, Ca, Mg, Pt, Au, B, P, Eu, Sm, W, V, Ba, Ta, Sn, Hf, Ce, Gd and Nd, $0 \leq a \leq 10$, $0 < b \leq 8$, and $2 \leq c \leq 13$.).

12. A positive electrode including the positive electrode active material of claim 1.

13. A lithium secondary battery using the positive electrode of claim 12.

* * * * *